INVENTOR.
HANS J. LOVENSTON
ATTORNEYS.

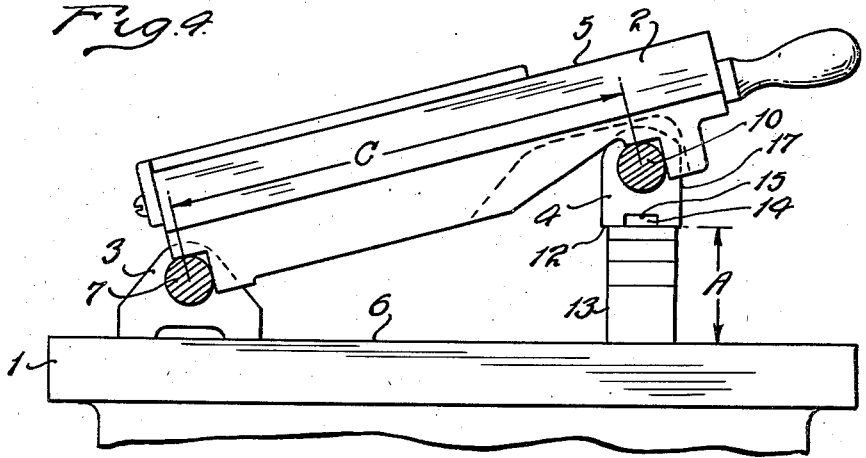
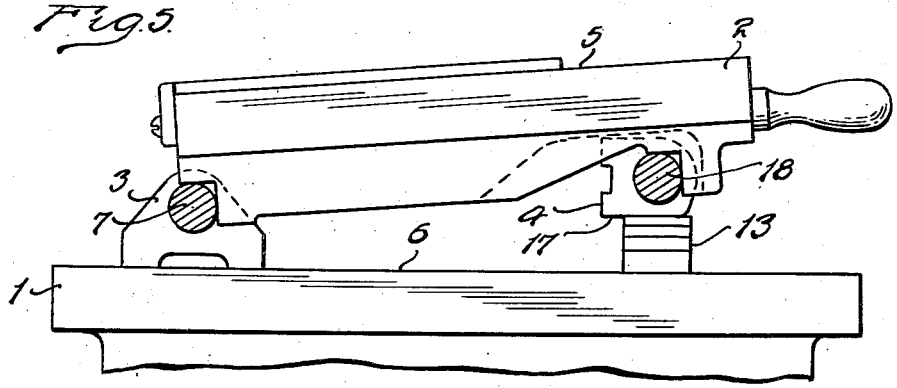
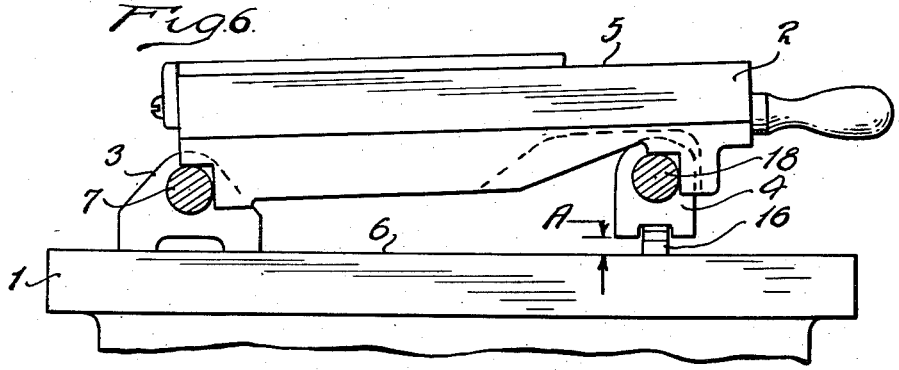
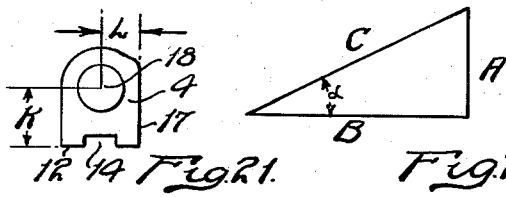

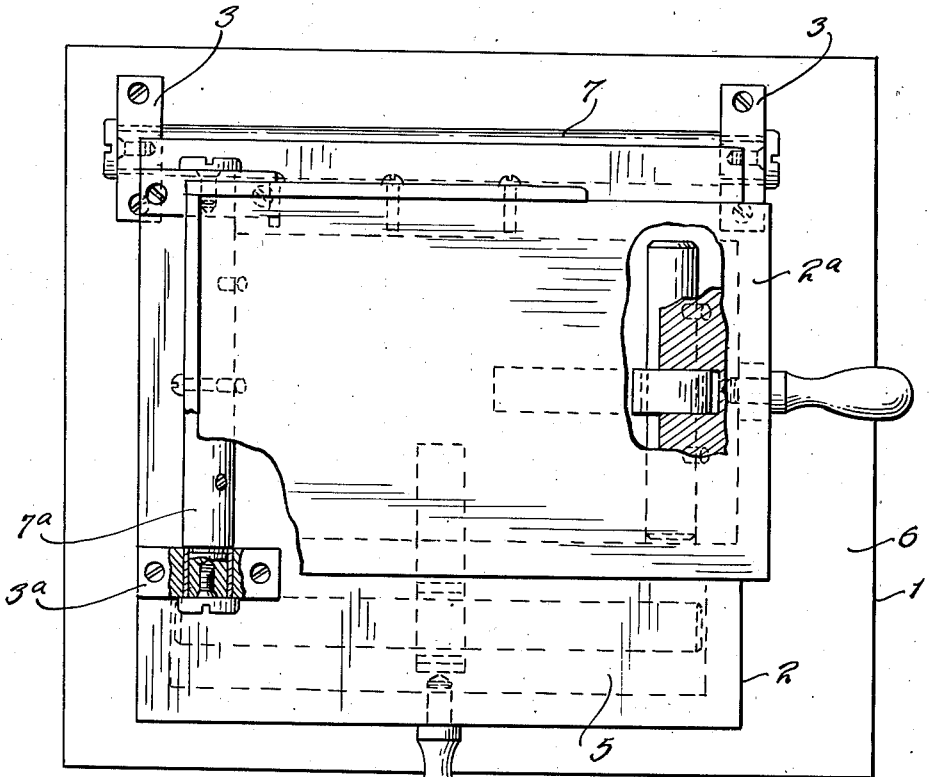

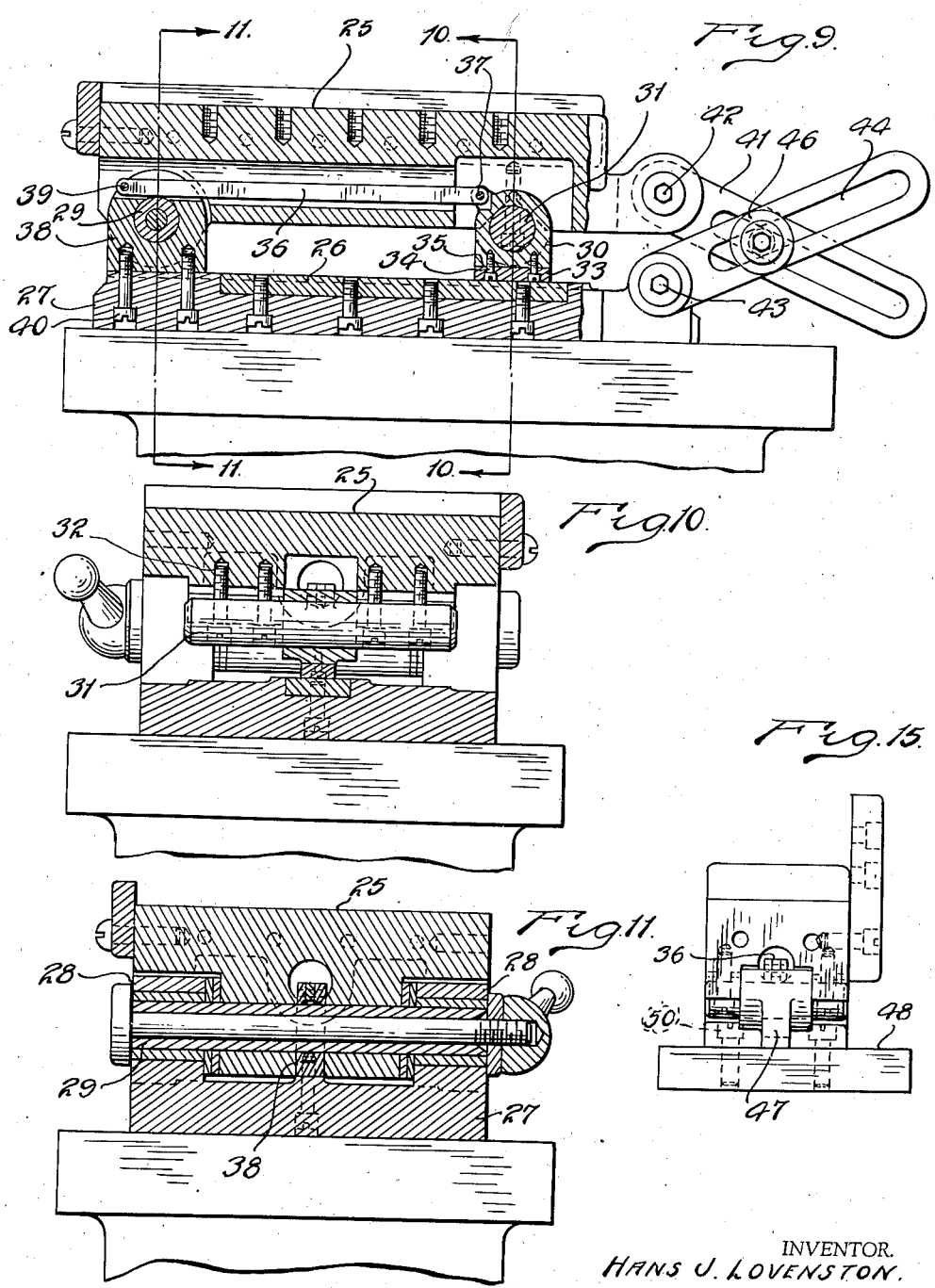

June 20, 1944.  H. J. LOVENSTON  2,351,773
DEVICE FOR DETERMINING ANGLES
Filed May 29, 1941  6 Sheets-Sheet 5

INVENTOR.
HANS J. LOVENSTON.
BY Barnes, Kisselle, Laughlin & Raisch
ATTORNEYS.

June 20, 1944. H. J. LOVENSTON 2,351,773
DEVICE FOR DETERMINING ANGLES
Filed May 29, 1941 6 Sheets-Sheet 6
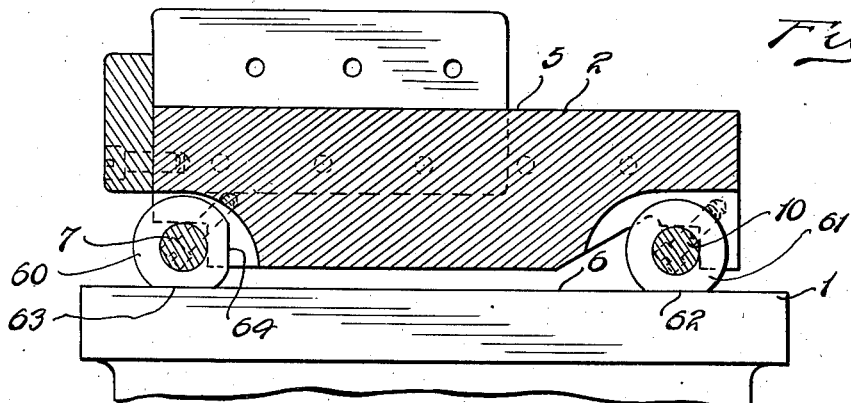
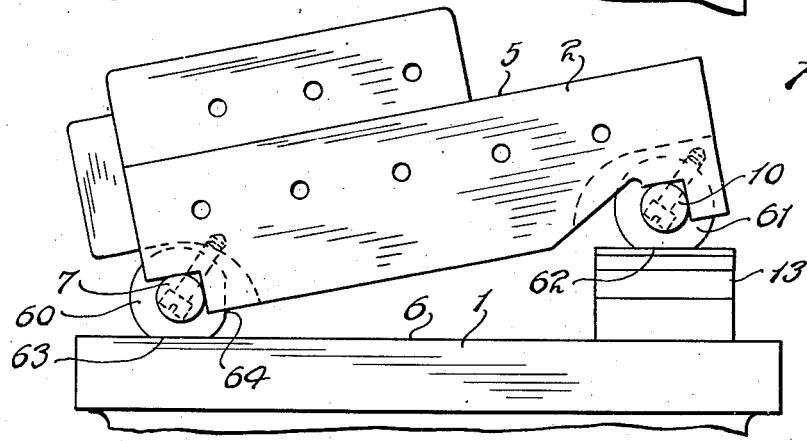
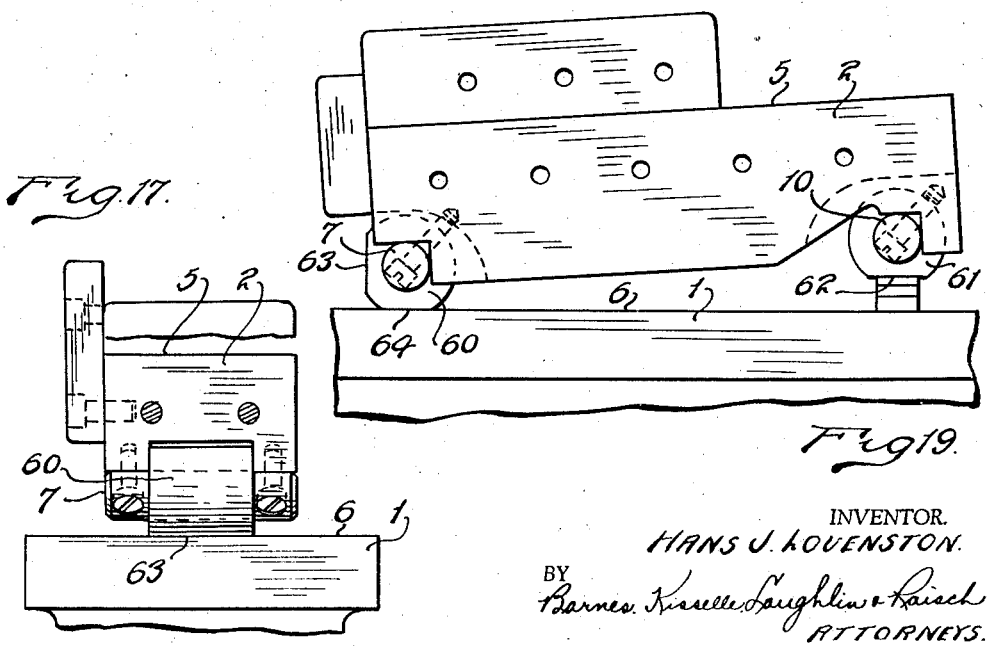
INVENTOR.
HANS J. LOVENSTON.
BY
Barnes, Kisselle, Laughlin & Raisch
ATTORNEYS.

Patented June 20, 1944

2,351,773

UNITED STATES PATENT OFFICE 2,351,773

DEVICE FOR DETERMINING ANGLES

Hans J. Lovenston, Detroit, Mich.

Application May 29, 1941, Serial No. 395,846

11 Claims. (Cl. 33—174)

This invention relates to a device for determining angles.

A device for determining angles is an instrument employed for supporting work at any predetermined angle, while performing one or more operations on the work by instrumentalities such e. g., as machine tools or as an inspection device for checking angles on precision work.

Devices for determining angles and their manifold uses are old and well known. One form of this device comprises a work holding table which is supported upon a surface plate by front and rear rollers having exactly the same diameter and spaced between their centers an exact, known distance, generally five or ten inches for the purpose of making calculations easier. The upper surface of the work table is supported absolutely parallel with the surface of the surface plate and is also parallel with a line passing through the center of the rollers.

Another form of this device comprises the same component members as above and in addition has a base plate. One of the rollers is pivotally mounted in two supports on the base plate in such a manner that when the roller on the free end rests on the top surface of the base plate the top surface of the work table, the center of the rollers and the bottom surface of the base plate are exactly parallel to each other.

To set the device at a given angle the device is pivoted about its roller on the pivotal end and the roller on the free end is supported upon precision gage blocks whose height has been determined by a simple trigonometric calculation for the given angle.

Gage blocks, which are used in setting this device to the angle desired, come in standard sets and any height in successive increments of .0001 inch can be obtained above .200 inch. Due to the ultimate in dimensional precision these gage blocks are quite expensive and reasonable care must be exercised to preserve the accuracy of these blocks. Well known gage blocks are the Hoke type which are square, and the Johanssen, or Swedish, type which are oblong in shape.

The above described types of devices for determining angles are old in the art but have definite shortcomings. On the device without a base plate the roller on the pivotal end makes a line contact with the surface plate and the roller on the free end makes a line contact on the precision gage block. Because of this, and due to the increase in load on the gage blocks by the work resting on the top surface of the work supporting member, the tendency of the roller is to make an impression on the gage block and thereby the accuracy of the gage blocks is greatly impaired and their usefulness may be destroyed. The roller on the pivotal end resting on the surface plate has the same tendency of making an impression in to the surface plate but due to the longer line contact of the roller on the plate this hazard is greatly reduced. Further the rollers, owing to the fact that they have a line contact with the surface plate and gage blocks, have a very low resistance to wear. The rollers will wear flat spots and thereby destroy the accuracy of the device. The device in the other form where one roller is pivotally mounted in two supports on a base plate, the danger of injuring and destroying the accuracy of the gage blocks remains.

Another definite shortcoming on the present devices is the setting of the device to an angle of which the calculated height of the gage blocks is .200 or less. As stated before, gage blocks come in standard sets and heights in successive increments of .0001 inch can only be obtained above .200 inch. In order to use the present devices where the height of the gage blocks is less than .200 inch, it is necessary to cut a groove into the surface plate or the top surface of the base plate to a known depth to receive gage blocks. Obviously the height of the gage blocks for setting the device to a desired angle will be the depth of the slot plus the calculated height of the gage blocks for the given angle. In this manner a combination of gage blocks can be obtained in successive increments of .0001 inch for small angles.

One of the principal objects of this invention is that of producing a device for determining angles which will appreciably reduce the wear on the expensive gage blocks in comparison with the devices of the prior art and eliminate the hazard or risk of injuring these precision gage blocks. A further object of this invention is to increase the duration of accuracy on the devices without a base plate as previously described. These objects are achieved by substituting a flat surface support for the roller support of the prior art. Another object of this invention is to eliminate the necessity of cutting a groove into a surface plate or on the top surface of the base plate in order to obtain gage block combinations in successive increments of .0001 inch for small angles where the calculated gage block height is .200 inch or less. This is accomplished by providing planar surfaces on one support located at different distances from the pivotal center.

In the drawings:

Fig. 4 is a sectional view showing my device in working position supported at one end by precision gage blocks.

Fig. 5 is a longitudinal sectional view through my device showing it in another working position where the angle of the work surface is much smaller than that shown in Fig. 4.

Fig. 6 is another longitudinal sectional view showing another working position of my device.

Fig. 7 is a top plan view showing two of my devices mounted one on top of the other for measuring compound angles.

Fig. 8 is an elevation of the two devices shown in Fig. 7.

Fig. 9 is a longitudinal sectional view through a modified form of the invention.

Fig. 10 is a section along the line 10—10 of Fig. 9.

Fig. 11 is a section along the line 11—11 of Fig. 9.

Fig. 15 is a front end view of the device shown in Fig. 14 taken along the lines 15—15 of Fig. 14.

Fig. 16 is a sectional view of another modified form of the device.

Fig. 17 is an end view looking at the device from the left hand end of Fig. 16.

Figs. 18 and 19 are side elevations of the device shown in Fig. 16 showing different positions of the device while in use.

Fig. 20 is a triangle for the purposes of illustration.

Fig. 21 is a detail of the front support.

Figure 2:
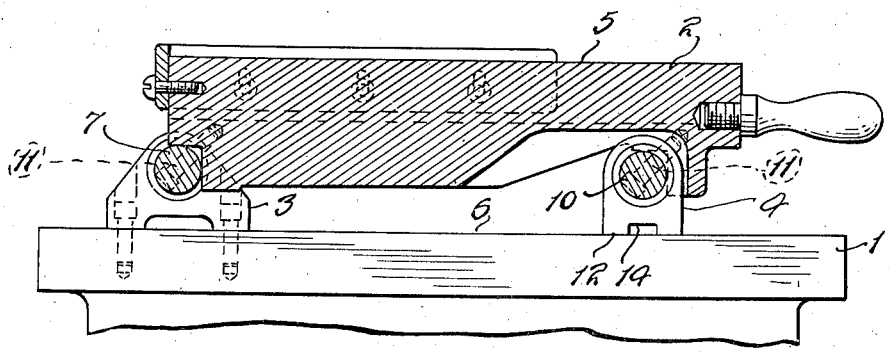
Fig. 2 is a section along the line 2—2 of Fig. 1.
Figure 3:
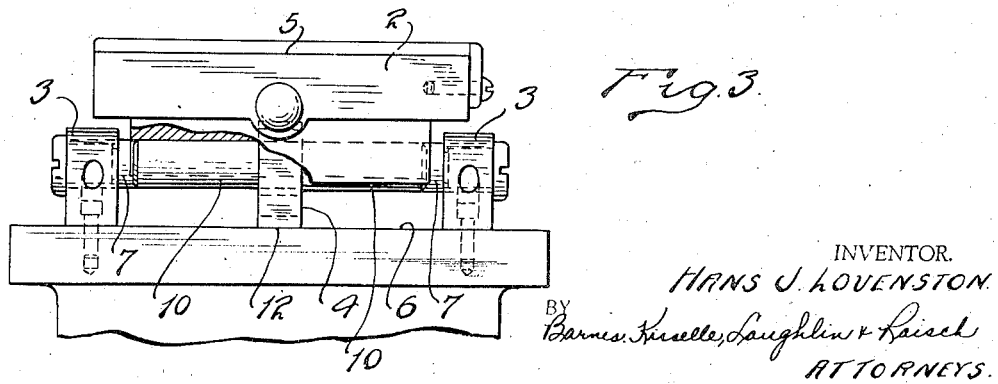
Fig. 3 is an end elevation of my device viewed from the right hand side of Fig. 1.

Referring more particularly to the drawings there is shown a sine table comprising a work supporting table 2 having two rear supports 3 and one front support 4. As shown in Fig. 2, the work supporting surface 5 of the work supporting table 2 is parallel with the top surface 6 of the surface plate 1. Table 2 is pivotally supported on supports 3. The pivotal connection comprises a shaft 7 fixed to the rear end of the table 5 and journalled in the supports 3 as at 8. The bottom face of support 3 is flat and has a surface to surface contact with the surface plate 1. Supports 3 are preferably secured by screws 9 to the surface plate 1. The front support 4 is pivotally mounted on shaft 10 centrally of the front end of table 2. Shafts 7 and 10 are fixed to the underside of table 2 by screws 11.

It will be seen that shafts 7 and 10 are journalled respectively in supports 3 and 4. Cylindrical shafts 7 and 10 are located very accurately so that a line passing through their centers is parallel with surface 5 of the work table and also with surface 6 of the surface plate 1 when support 4 is in the position shown in Fig. 2. Support 4 has a flat bottom face 12 having a surface contact with the plate 1 or with the gage blocks 13. The support 4 has recess 14 in its lower surface 12. The upper surface 15 of the recess 14 is a flat, plane surface parallel with surfaces 5 and 6 when in the position shown in Fig. 2. Recess 14 is made slightly wider than the width of standard gage blocks. The depth of this recess is arbitrary but must be at least .2 inch deep.

If we had to set the sine table to a small angle in which A is less than .2 inch we use the support block as shown in Fig. 6 in order to obtain a gage block combination in increment of .0001 inch. A as shown in Fig. 20 is the side of the triangle opposite the angle alpha. A is the distance that center 18 of front support 4 of the work table 2 is elevated from the position shown in Fig. 2 to get the angle desired. C in the triangle corresponds to the distance between the centers of shafts 7 and 10. A equals C times sine alpha. For example, if we had to set the device so that surface 5 makes an angle alpha with surface 6 such that A equals .0005 inch, we would make up a combination of blocks which are equal to the depth of recess 14 in support 4 plus .0005 inch and rest the support 4 in recess 14 on these blocks 16 as shown in Fig. 6.

Where A equals .2 inch or less we can also swing support 4 through an angle of 90 degrees from the position shown in Fig. 4 to the position shown in Fig. 5 and use of face 17 of the support for resting upon the gage blocks 13. Face 17 is flat and, of course, made with precision. As shown in Fig. 21 distance L between center 18 of support 4 and face 17 is at least .2 inch less than distance K which is the distance from center 18 to the lower face 12 of support 4. The setting of the table for small angles is equal to A plus (K minus L) plus L. Assuming that distance A is .001 inch and assuming that L is 1.0 inch and K is 1.25 inch, K minus L equals .25 inch. With the support 4 in the position indicated in Fig. 5, the distance from center 18 to face 17 being 1.0 inch we would make up a combination of gage blocks 13 which is equal to a height of .251 inch and rest face 17 of support 4 on this combination of blocks. This would make A equal to .001 inch. A is always the distance that center 18 has to be raised from the position shown in Fig. 2 when surfaces 5 and 6 are parallel in order to get the angle desired between faces 5 and 6. Angle alpha can also be considered as the angle that surface 6 makes with a line passing through the centers of shafts 10 and 7.

It is evident from the uses illustrated in Figs. 4, 5 and 6 of this device that surfaces 12, 17 and 15 will always make a surface to surface contact with the precision gage blocks and thereby appreciably cut down the wear on these blocks and reduce the hazard of injuring these blocks. Further, these faces 12, 17 and 15 are all flat or planar and therefore have no lines or points along which they can wear flat spots to decrease their accuracy as is the case with the roller support. It further illustrates the means for obtaining a setting of this device for small angles by having planar surfaces 15 and 17 located closer to center 18 of shaft 10 than planar support surface 12.

Figs. 7 and 8 show how easy it is to combine two of the devices above described to obtain a compound angle. In such case we take the device shown in Figs. 1 through 6, with surface plate 1 and work table 2 supported thereon by supports 3 and 4. Then using work table 2 as a support we mount another work table 2a thereon but with the pivot shaft 7a extending at right angles to pivot shaft 7. Rear supports 3a are secured by screws to work table 2. Front support 4a rests upon surface 5 of table 2. Thus, by turning the lower table 2 about its fulcrum 7 and resting support 4 on a combination of precision gages to get the height desired, and then by turning upper table 2a about its fulcrum 7a and resting its support 4a upon the correct height of gage blocks, we can obtain any compound angle desired.

In the form shown in Figs. 9 through 13 the work table is designated 25 and the surface plate 26. Surface plate 26 is supported upon base 27 having integral lugs 28 which support shaft 29 upon which the work table 25 is pivotally supported at one end. The support 30 for the other or free end of the work table 25 is pivotally mounted on shaft 31 secured by screws 32 to the underside of the work table 25. Support 30 is provided with a removable bottom plate 33 secured to the bottom face 35 of support 30 by screws 34.

It is proposed to maintain bottom face 35 substantially parallel with the upper face of surface plate 26 at all elevations of the table 25. To this end a link 36 is pivotally connected at one end to support block 30 as at 37 and at the other end to a block 38 as at 39. Block 38 is secured by screws 40 to the base 27. Pivotal connection 37 is positioned the same distance from the center of shaft 31 that pivotal connection 39 is positioned from the center of shaft 29. Thus, link 36 is always parallel to and defines a parallelogram with a line running through the centers of shafts 31 and 29. Link 36 acts upon support 30 to at all times maintain surface 35 substantially parallel with surface plate 26. The pin connection 37 between link 36 and support 30 is made a little loose to allow a little slack so that the support 30 has a small amount of free movement so that the contact surface 35 will seat fully on the gage block surface.

Figure 12:
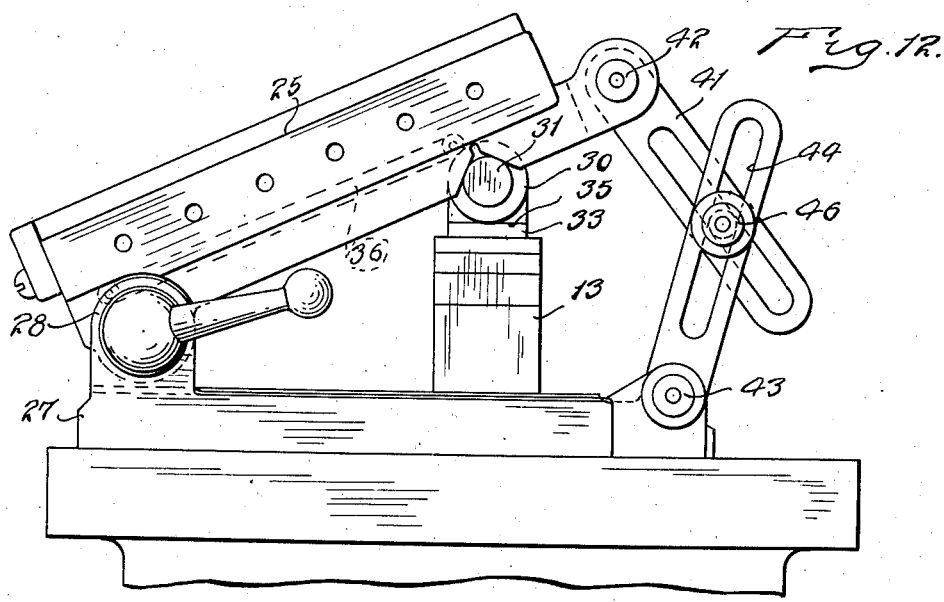
Figs. 12 and 13 are each side elevations of the device shown in Fig. 9 showing different positions of the device in use.
Figure 13:
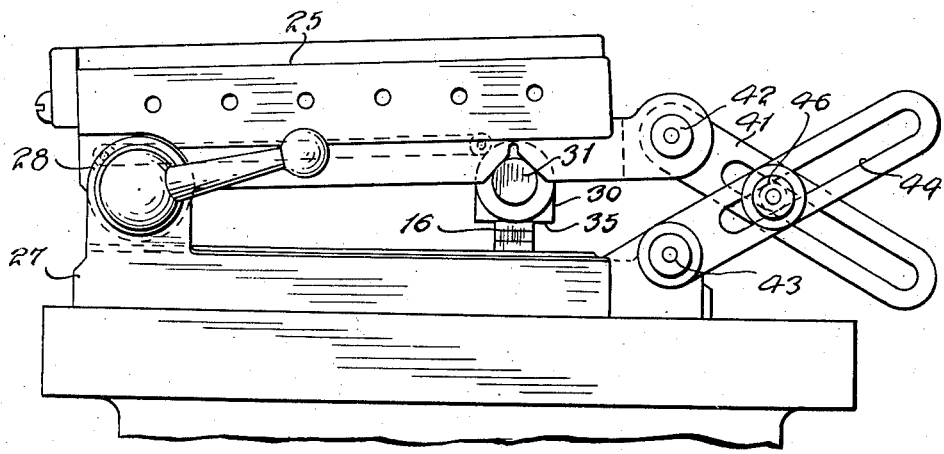

One link 41 is pivotally connected to the table 25 as at 42 and a pair of links to base 27 at 43. The links are provided with elongated slots 44 which accommodate a set bolt 45 with a nut 46 which may be set to hold the links in any of their positions of adjustment. Where larger angles are being measured, support plate 33 will be used with the support 30, as shown in Fig. 12. Where the angle to be measured is small, plate 33 is removed and bottom surface 35 of support 30 is used as the contact surface with the gage blocks 16. The plate 33 is removed where the dimension A is less than about .2 of an inch.

Figure 14:
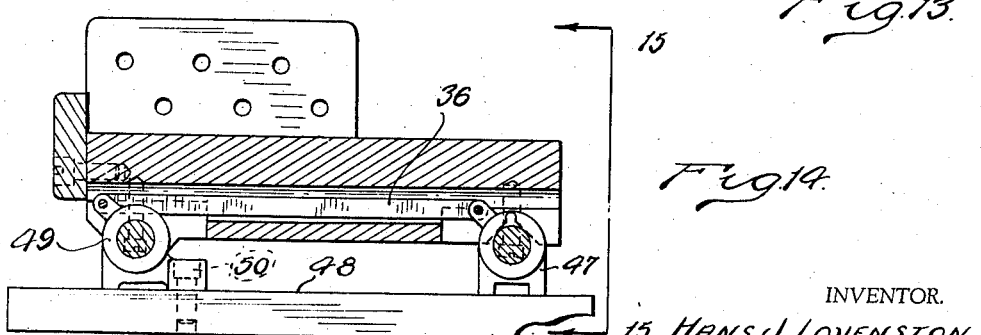
Fig. 14 is a longitudinal section of another modified form of the device.

In the form shown in Fig. 14 the front support 47 is similar to support 4 but is controlled by a link 36 for parallel motion with surface plate 48 the same as support 30. In this form the support 49 is similar to support 3 and also corresponds to block 38 of Fig. 9 and is secured by screws 50 to the surface plate 48.

Figure 1:
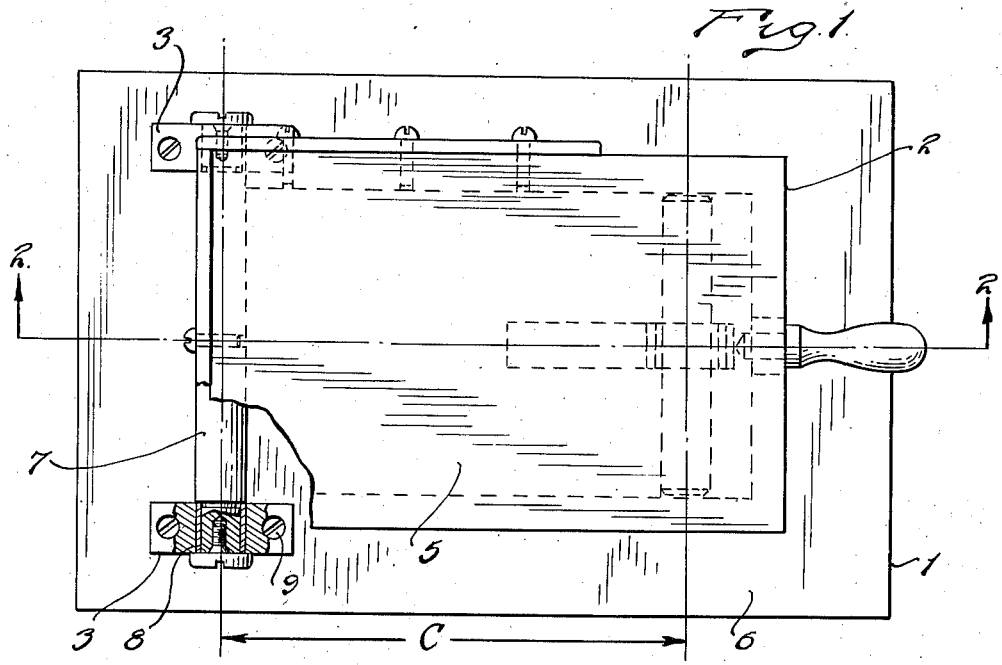
Fig. 1 is a top plan view of my device.

In the form shown in Figs. 16 through 19 the work table 2 and the surface plate 1 are the same as shown in Fig. 1. In this form of the invention there is one rear support 60 and one front support 61 in the form of cylindrical bushings rotatably mounted on shafts 7 and 10. Bushing 61 has a flat surface 62 for contact with the surface plate 1 and with the gage blocks 13. Bushing 60 has a flat surface 63 corresponding to surface 62, that is, surfaces 62 and 63 are located equal distances from the centers of shafts 7 and 10. Thus, when the supports 60 and 61 are positioned as shown in Fig. 16 with contact surfaces 62 and 63 resting on surface plate 1, surfaces 5 and 6 are parallel.

Support 60 has another flat surface 64 which is positioned at a greater distance from the center of shaft 7 than contact surface 63. Surface 64 is used where the calculated height or distance A is less than .2 of an inch. Surface 64 is brought into position for contact with surface plate 1 by rotating the same 90 degrees clockwise from the position shown in Fig. 16 to that shown in Fig. 19.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:

1. A device for determining angles, comprising a member for holding work thereon, a support on one end of said work holding member, means pivotally connecting said support to said end of said work holding member whereby said member can be swung about said support to any angle desired, a support at the other end of said work holding member, and means pivotally connecting said latter support to the said other end of said member, said latter support having a flat surface adapted for contact with another flat surface to distribute the load of said device itself and the load of the work on said device over a substantial area on said flat surface on said support and the surface in contact with said flat surface on said support.

2. A device for determining angles, comprising a member for holding work thereon, a support on one end of said work holding member, and means pivotally connecting the said support and said end of said work holding member whereby said member can be swung about said support to any angle desired, a second support pivotally connected to the other end of said work holding member and having a flat surface adapted for contact with another flat surface to distribute the load of said device itself and the load of the work on said device over a substantial area on said flat surface on said support and the surface in contact with said flat surface on said support, the flat surface on said second support being positioned a distance from the center of pivoting so that when the top surface of said work holding member is parallel with the flat surface upon which said flat surface on said second support rests a line passing through the center of pivoting on one end of said work holding member and through the center of pivoting of said second support on the other end of said member will also be parallel with the surface upon which the flat surface of said support rests.

3. A device for determining angles, comprising a member for holding work thereon, a support on one end of said work holding member, and means pivotally connecting said support and said end of said work holding member whereby said member can be swung about said support to any angle desired, a support pivotally connected to the other end of said work holding member having a flat surface adapted for contact with another flat surface, said latter support having a recess in its flat contact surface, said recess having a flat planar surface adapted for contact with another surface.

4. A device for determining angles, comprising a member for holding work thereon, a support on one end of said member, and means pivotally connecting the said support and said end of said work holding member whereby said work holding member can be swung about said support to any angle desired, a support pivotally connected to the other end of said work holding member having a flat surface adapted for contact with another surface, said latter support having a recess in its flat planar surface for contact with another surface, said recess having a depth equal to or greater than the smallest combination of gage blocks obtainable in successive increments of .0001 inch.

5. In a device for determining angles, a support, having a flat bottom face pivotally connected to the work support member adjacent one end, said support having a recess therein with a flat surface adapted to receive and have a surface to surface contact with gage blocks used for setting the work holding member to an angular position, said recess having a depth equal to or greater than the smallest combination of gage blocks which can be obtained in successive increments of .0001 inch.

6. In a device for determining angles, a support pivotally connected to the work holding member adjacent one end, said support having a plurality of flat contact surfaces positioned at different distances from the center of pivoting of said support, each one of said flat surfaces adapted for contact with another flat surface to distribute the load of said device and on said device over a substantial area on said flat surface on said support and the flat surface in contact with said flat surfaces on said support, one of said flat surfaces on said support being positioned nearer to the center of pivoting of said support a distance equal to or greater than the smallest combination of gage blocks obtainable in increments of .0001.

7. In a device for determining angles, a support pivotally connected to the work holding member adjacent one end, said support having a pair of flat surfaces in angular position to each other, said flat surfaces being positioned different distances from the center of pivoting of the support whereby the support can be swung about its pivot to change the elevation of the work holding member, each of said flat surfaces adapted to have surface contact with another surface, the one flat surface being positioned from the center of pivoting further than the other flat surface a distance equal to or greater than the smallest combination of gage blocks which can be obtained in successive increments of .0001 inch.

8. A device for determining angles, comprising a member for holding work thereon, a support at one end of the work holding member and means pivotally connecting the support and one end of said member whereby said member can be swung about said support to any angle desired, a support for the other end of said member pivotally connected hereto, said latter support having a pair of flat surfaces, each of said flat surfaces being adapted for contact with other flat surfaces, one of said surfaces being positioned a distance from the center of pivoting so that when the support is rested upon this surface the work supporting surface of the work holding member will be parallel with the surface upon which the said support rests, the other face of said support being positioned closer to the center of pivoting by a distance at least equal to or greater than the smallest combination of gage blocks obtainable in successive increments of .0001 inch.

9. A device for determining angles, comprising a member for holding work thereon, a support at one end of said member and means pivotally connecting said support and one end of the work holding member, said support having a flat bottom surface for contact with another surface, a support pivotally connected to the other end of the work holding member having a flat bottom surface adapted for contact with another surface, said support having a flat recess in its bottom surface equal to or greater than the smallest combination of gage blocks which can be obtained in successive increments of .0001 inch, a link having pivoted connection with said supports on both ends for maintaining the bottom face of the support on the free end of the work holding member parallel with the contact surface of the support on the pivotal end of the work holding member as the work table is pivoted about its support, said link extending parallel to a line running through the pivotal centers of said supports.

10. A device for determining angles, comprising a base, a member for supporting work thereon, pivotally supported on one end of said base, a support for the free end of the work holding member pivotally connected on said member and having a flat bottom surface adapted for contact with another surface, a stationary member fixed to the base adjacent to the pivoted end of the work holding member, a link, pivotal connections between the ends of said link and the said stationary member and the said pivoted support, said pivotal connections being positioned equal distances from the pivotal center about which the work holding member swings and the support pivot, said link being at all times parallel to a line running through said centers of pivoting whereby the bottom contact surface of said support is maintained parallel to the top surface of the base at all positions of the work supporting member.

11. In a device for determining angles comprising a member for holding work thereon, a support on one end of said work holding member, means pivotally connecting said support and said end of said work holding member whereby said work holding member can be swung about said support to any angle desired, a second support pivotally connected to the other end of said work holding member having a plurality of flat surfaces, each of said flat surfaces being adapted for contact with another flat surface to distribute the load of said device and on said device over a substantial area on said flat surface on said second support and the surface in contact with the flat surface on the second support, at least one of said flat surfaces on said second support being positioned at a distance from the center of pivoting so that when the top surface of said work holding member is parallel with the flat surface upon which the said one of said flat surfaces on said second support rests, a line passing through the center of pivoting on one end of said work holding member and through the center of pivoting of said second support on the other end of said work holding member will also be parallel with the surface upon which the said one flat surface of said second support rests, the axes about which the first and second supports pivot being equidistant from the work supporting surface of said work holding member.

HANS J. LOVENSTON.